United States Patent
Goujon et al.

(10) Patent No.: US 7,660,193 B2
(45) Date of Patent: Feb. 9, 2010

(54) INTEGRATED SEISMIC SENSOR CABLE

(75) Inventors: Nicolas Goujon, Oslo (NO); Johan Fredrik Naes, Trondheim (NO); Rune Voldsbekk, Drammen (NO)

(73) Assignee: WesternGeco L.L.C., Houston, TX (US)

( * ) Notice: Subject to any disclaimer, the term of this patent is extended or adjusted under 35 U.S.C. 154(b) by 109 days.

(21) Appl. No.: 10/532,646

(22) PCT Filed: Nov. 14, 2003

(86) PCT No.: PCT/EP03/50836
§ 371 (c)(1),
(2), (4) Date: Dec. 5, 2005

(87) PCT Pub. No.: WO2004/046682
PCT Pub. Date: Jun. 3, 2004

(65) Prior Publication Data
US 2006/0117874 A1     Jun. 8, 2006

(30) Foreign Application Priority Data
Nov. 15, 2002   (GB)   ................. 0226674.0

(51) Int. Cl.
*G01V 1/38* (2006.01)
(52) U.S. Cl. .......................... 367/20; 367/15
(58) Field of Classification Search ............ 367/15, 367/19, 20
See application file for complete search history.

(56) References Cited

U.S. PATENT DOCUMENTS

| | | | |
|---|---|---|---|
| 2,788,513 A | 4/1957 | Howes | |
| 3,418,624 A | 12/1968 | Massa | |
| 3,660,809 A | 5/1972 | Pearson | |
| 4,491,939 A | 1/1985 | Carpenter | |
| 4,725,990 A | 2/1988 | Zibilich, Jr. | |
| 4,821,241 A | 4/1989 | Berglund | |
| 5,265,066 A | 11/1993 | Svenning et al. | |
| 5,724,306 A * | 3/1998 | Barr | ............................ 367/15 |
| 5,943,293 A | 8/1999 | Luscombe et al. | |
| 6,021,091 A | 2/2000 | Gaiser | |
| 6,041,282 A | 3/2000 | Wardeberg et al. | |

(Continued)

OTHER PUBLICATIONS

International Search Report dated May 18, 2004, for Application No. PCT/EP03/50836.

(Continued)

*Primary Examiner*—Scott A Hughes
(74) *Attorney, Agent, or Firm*—Jeff Pyle; Richard V. Wells; Kevin McEnaney

(57) ABSTRACT

A seismic cable (110) and a method for producing a seismic cable are disclosed. The seismic cable (110) comprises a sensor module (130); at least one lead (210) to or from the sensor module (130); a stress member (225) extending continuously through the sensor module (130); and a sheath (230) enclosing the leads (210) and the stress member (225), the sheath (230) terminating at each end of the sensor module (130), and at least one mechanical guide (240) in the sensor module (130) deflecting the stress member (230). The method comprises providing a cable core including a stress member (225) and a lead (210); enclosing the cable core in a sheath (230); providing an opening in the sheath (230); and assembling a sensor module (130) to the cable core over the opening such that the stress member (225) extends continuously through the sensor module (130).

19 Claims, 5 Drawing Sheets

U.S. PATENT DOCUMENTS

| | | | |
|---|---|---|---|
| 6,108,267 A | 8/2000 | Pearce | |
| 6,188,646 B1 | 2/2001 | Luscombe et al. | |
| 6,294,727 B1 | 9/2001 | Orlean | |
| 6,333,897 B1 | 12/2001 | Knudsen et al. | |
| 6,333,898 B1 | 12/2001 | Knudsen et al. | |
| 6,430,105 B1 * | 8/2002 | Stephen | 367/15 |
| 6,477,111 B1 | 11/2002 | Lunde et al. | |
| 6,519,395 B1 * | 2/2003 | Bevan et al. | 385/100 |
| 2003/0223822 A1 * | 12/2003 | Oldervoll et al. | 405/158 |

OTHER PUBLICATIONS

UK Search Report dated Apr. 1, 2003, for Application No. GB 0226674.0.

* cited by examiner

INTEGRATED SEISMIC SENSOR CABLE

BACKGROUND OF THE INVENTION

1. Field of the Invention

This invention relates generally to seismic cable systems, and, more particularly, to a robust and reliable seabed seismic cable system.

2. Description of the Related Art

Subsurface hydrocarbon accumulations are increasingly found in geologically complex areas. The ability to conduct accurate seismic surveys may help improve the discovery rates and even the production of such accumulations. Seismic surveying is a method of stimulating a geological subsurface formation with, e.g., electrical, magnetic, and/or acoustic signals to acquire seismic data about the formation. From this data, one can predict whether the formation contains hydrocarbon deposits and, if so, where.

One type of seismic survey is generally referred to as a "marine" survey because it is typically conducted at sea, although this is not necessarily always the case. During marine seismic surveys, seabed seismic cable systems are deployed to the bed of a sea, lake, river, or marsh. The water depth may range from several thousand meters up to the water/land transition zone. Water currents of considerable speed may pass over the cable system and create instability and deterioration of the seismic data quality.

Seabed seismic cable systems generally are designed to meet two conflicting goals. First, the cable system must be robust and resistant to damage. For example, the cable system must survive and operate at great water depth. Also, the cable system may be roughly handled during deployment and retrieval. Second, the cable system should be sensitive to acoustic vibrations and not compromise the quality of data recorded by the sensor units. To design and construct a robust but sensitive cable requires balancing robustness and sensitivity through a large number of tradeoffs.

Although there are several types of seabed seismic cables, there are generalities in construction. A seabed seismic cable includes three main elements: stress members, leads, and a sheath One or several stress members take the tension that can be applied to the seabed seismic cable during deployment and retrieval operations to protect other elements of the seismic cable. The leads, which may be electrical or optical, transmit power and/or data, in analogue or digital format, along the cable for collection and processing, e.g., on a survey vessel. The sheath is a skin, jacket or extrusion matrix protecting the seabed seismic cable against, notably, water ingress.

A seismic cable will generally have sensor modules distributed along its length. Inside the sensor module are sensors. Examples of sensors are geophones, accelerometers, hydrophones, tilt meters, magnetometers. The sensors can include electronics conditioning the signal and/or digitizing it. The sensors can be connected by the leads mentioned above, transmitting the sensor data through the seismic cable to electronics modules located along the cable or between cable sections, or can be connected by a data bus.

One type of seabed cable is known as an "ocean bottom cable" ("OBC"), and is typically equipped with "takeouts." For example, the use of a take out anchor and protective cover is described in U.S. Pat. No. 6,294,727 to Orlean. A full length of conventional OBC is seismic built, the jacket is then opened at the location were the sensors are located, and leads are extracted from the cable to form a take-out and connected to the sensors. The sensors are then attached to the cable.

These types of cable are prone to water intrusion, electrical leakage, and wire kinking, as the take-outs are submitted to a high level of strain during cable handling. These cables usually have an asymmetric cross-section at the sensors, and the response will change depending on how the sensors rest on the seafloor. These types of cables also expose the seismic receivers and the takeouts to a number of potentially damaging obstacles on the seabed, thereby reducing the reliability of the collected data. Furthermore, because the takeouts are extracted from the cable and not a separate component, the entire cable may need to be replaced if the takeouts are damaged, which can be expensive and time-consuming.

Another type of seabed seismic cable system is commonly referred to as a logging type cable. Logging type cables typically have a full electrical/optical termination at each sensor unit, resulting in a high number of connection points. The high number of connection points negatively impacts the cable's reliability. Furthermore, the increased number of terminations makes the sensor unit large and heavy, which negatively impacts data quality.

Yet another type of seabed seismic cable system comprises conventional cables with sensor units integrated inside a protective cable jacket One variation is known as a "streamer type" cable. The streamer type cable is an evolution of a towed seismic streamer for deployment on the seabed. The streamer type cable comprises spacers, sensor units, and a filler, which usually is oil. The streamer type cable has a constant diameter and therefore occupies a large volume when stored. An alternative variation is known as a "solid cable." Examples of the solid cable include a constant diameter solid cable disclosed in U.S. Pat. No. 6,041,282 to Wardeberg et al. and a variable diameter solid cable disclosed in U.S. Pat. Nos. 6,333,897 and 6,333,898 to Knudsen et al. Both the constant diameter and the variable diameter solid cables pose potentially serious drawbacks. For instance, the constant diameter solid cable is extremely large, heavy and stiff, while the variable diameter solid cable is difficult to manufacture.

In U.S. Pat. No. 5,265,066 to Svenning et al., a seismic seabed cable including at least one pulling cable, a data cable, and a sleeve which surrounds the data cable and the pulling cable is disclosed. Groups of geophones and position metering instruments are placed along the cable with the position metering instruments and geophones being disposed in a geophone sphere. However, the volume and size of the seismic seabed cable described by Svenning may compromise data quality and robustness of the cable while the cable is being handled.

The present invention is directed to overcoming, or at least reducing the effects of, one or more of the problems set forth above.

SUMMARY OF THE INVENTION

The invention, in its various aspects and embodiments, includes a seismic cable and a method for producing such a seismic cable. The seismic cable comprises a sensor module; at least one first lead to or from the sensor module; a stress member extending continuously through the sensor module; a first sheath enclosing the first lead and the stress member, the first sheath terminating at each end of the sensor module, and at least one mechanical guide in the sensor module deflecting the stress member. The method comprises providing a cable core including a stress member and a lead; enclosing the cable core in a sheath; providing an opening in the sheath; and assembling a sensor module to the cable core over the opening such that the stress member extends continuously through the sensor module.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
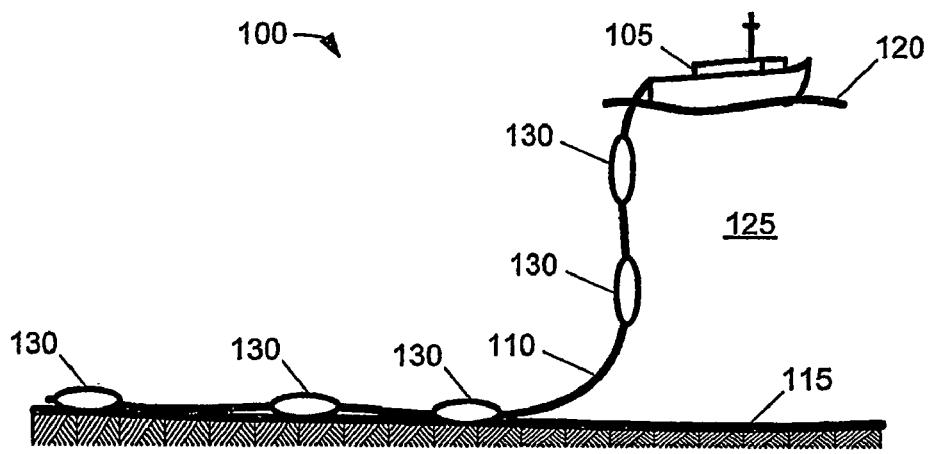
FIG. 1 illustrates a seismic survey vessel from which a seismic cable constructed and operated in accordance with the present invention is deployed.

FIG. 1 illustrates a seismic survey system 100 in which a seismic survey vessel 105 has deployed a seismic cable 110 to the bed 115 from the surface 120 of a body of water 125. In the illustrated embodiment, the body of water 125 is part of an ocean. Consequently, the bed 115 is a seabed (or ocean floor). However, the invention is not so limited, as the invention may used for surveys conducted in fresh and brackish waters. The seismic cable 110 includes a plurality of sensor modules 130, housing sensors (not shown) as was discussed above. Note that the number and distribution of sensor modules 130 on the seismic cable 110 is not material to the practice of the invention. Instead, these factors will largely be implementation specific, driven by the design of the survey to be conducted. Note also that more than one seismic cable 110 will usually be deployed to conduct a survey. In such embodiments, the seismic cables may be deployed in conventionally configured arrays.

Figure 2A:
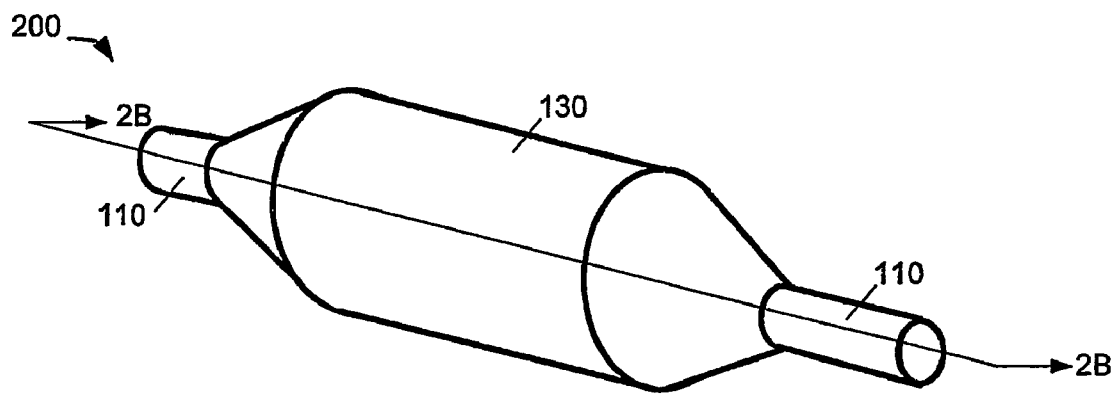
FIG. 2A and FIG. 2B illustrate, in a perspective and in a side, partially sectioned view, respectively, a portion of the seismic cable in FIG. 1 including a sensor module in accordance with one embodiment of the present invention.
Figure 2B:
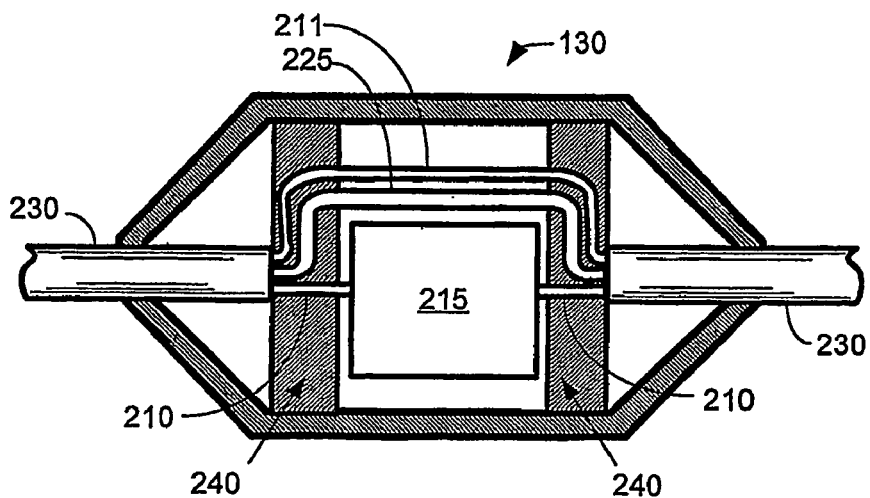

FIG. 2A and FIG. 2B illustrate, in a perspective and in a side, partially sectioned view, respectively, a portion 200 of the seismic cable in FIG. 1, including a sensor module 130 in accordance with a first illustrative embodiment of the present invention. The view in FIG. 2B is sectioned along the line 2B-2B in FIG. 2A. The illustrated sensor module 130 is generally cylindrical in shape, but others may be used. For instance, the sensor module 130 may be generally rectangular in alternative embodiments. The seismic cable 110, as is shown more clearly in FIG. 2A and FIG. 2B, comprises the sensor module 130 housing a sensor unit 215, at least one lead 210, 211 supplying power to and/or transmitting data from the sensor unit 215, a stress member 225 extending continuously through the sensor module 130, and a sheath 230. The sheath 230 encloses the leads 210 and the stress member 225, the sheath 230 terminating substantially near each end of the sensor module 130.

The seismic cable 110, as illustrated in FIG. 2A and FIG. 2B, further comprises mechanical guides 240 to deflect the stress member 225 inside the sensor module 130. The mechanical guides 240 are placed adjacent to each side of the sensor unit 215 for deflecting the stress member 225 to one side of the sensor housing, thereby allowing space for the sensor module 130. This permits placing the sensor unit 215 closer to the centre of gravity of the sensor module 130. The mechanical guides 240 provide a degree of axial symmetry to the seismic cable 110 and the sensor module 130. Therefore, the mechanical guides 240 also improve sensor unit 215 to ground coupling, and thereby the quality of data recorded by the sensor unit 215. Note that some alternative embodiments might employ only one or more than two mechanical guides 240. Some alternative embodiments might also employ the mechanical guide(s) 240 to deflect the lead 211, permitting the lead 210 to pass straight through, as shown in FIG. 2B. In other alternative embodiments the mechanical guide(s) 240 may also be used to deflect both leads 210 and 211.

The invention admits wide variation in the implementation of the sensor unit 215, the leads 210, 211, and the stress member 225. The sensor unit 215 may comprise one or more sensors (not shown). The sensors may be any sensor known to the art. Examples of sensors include, but are not limited to, geophones, accelerometers, hydrophones, tilt meters, and magnetometers. The sensor unit 215 may include electronics (not shown) for conditioning the signal and/or digitizing it. The invention is not limited by the type and/or nature of the sensor unit 215 in any given embodiment. Examples of suitable stress members 225 include, but are not limited to, aramide wire, steel wire and utility cable. Similarly, the leads 210, 211 may be optical lead or electrical leads. The leads 210, 211 may also be for, e.g., supplying power to the sensor unit 215 or transmitting data from the sensor unit 215. As those in the art having the benefit of this disclosure will appreciate, most embodiments will includes a plurality of leads 210, 211 that may be used for both supplying power and transmitting data and may be a mix of optical and electrical leads.

The sensor unit 215, the leads 210 and 211, and the stress member 225 (hereinafter referred to as "cable core") are exposed to the interior of the sensor module 130. In one embodiment, the sensor module 130 provides a substantially static environment for the cable core that is protected from water ingress and exterior forces. In one embodiment the lead 211 is generally unattached to the stress member 225 inside the sensor module 130. In an alternative embodiment, however, the lead 211 and the stress member 225 may be attached, thereby reducing Z-kinks and snatching in the lead 211. Outside the sensor module 130, the cable core is enclosed by a sheath, or protective outer covering, 230. The sheath 230 protects the cable core from physical damage and water intrusion. The sheath 230 terminates substantially near each end of the sensor module 130.

As mentioned, it should be appreciated that the sensor unit 215 may comprise more than one sensor. An increased number of sensors may be used to provide greater accuracy and/or redundancy. Furthermore, it should also be appreciated that alternative embodiments may comprise more than one stress member 225 for providing greater tension relief to the seismic cable 110, and to help achieve symmetry about the seismic cable 110. Although only the lead 210 is shown connected to the sensor module 215, additional leads such as lead 211 may extend continuously through the sensor module 130, bypassing the sensor unit 215. Furthermore, in alternative embodiments, one or more leads 210 may be grouped together and enclosed in a protective lead covering (not shown in FIG. 2B). Each grouping is known as a "bundle."

Figure 3A:
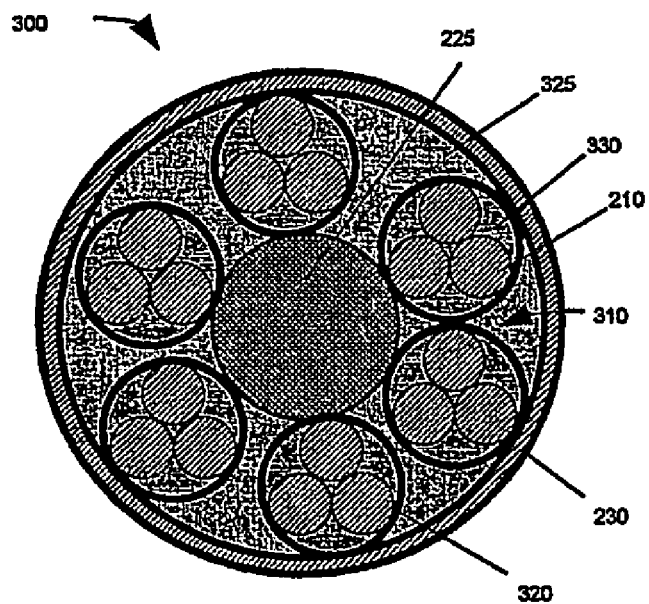
FIG. 3A and FIG. 3B are cross-sectional views of alternative embodiments illustrating various structures of the seismic cable in FIG. 1.

FIG. 3A is a cross-sectional view of one particular embodiment 300 of the seismic cable 110. At the centre of the seismic cable 110 is the stress member 225. Located around the stress member 225 are six bundles 310 (only one indicated). Each bundle 310 may comprise one or more leads 210 (only one indicated) surrounded by a protective lead covering 320. The protective lead covering 320 provides the leads 210 with a second level of protection, in addition to the sheath 230, from physical damage and water intrusion. It should be appreciated that one or more bundles 310 and leads 210 may bypass the sensor unit 215 without connecting to the sensor unit 215.

In the illustrated embodiment, the interstitial spaces of the seismic cable 110 among the bundles 310 are filled with a filler 325. The interstitial spaces of the bundles 310 among the leads 210 are similarly filled with a filler 327. The fillers 325, 327 may be used to, e.g., absorb any water that may intrude and/or control density in a manner known to the art.

Figure 3B:
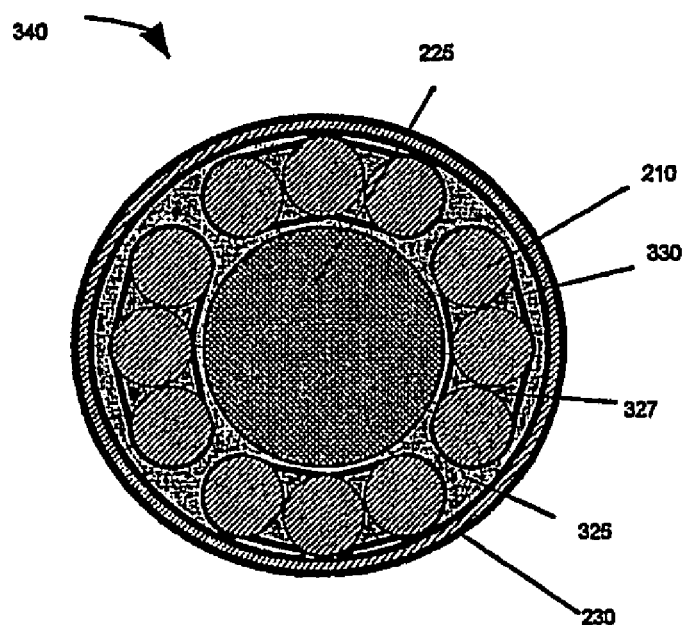

In an alternative embodiment 340, shown in FIG. 3B, instead of the cylindrically shaped bundle 310 used in FIG. 3A, a flat bundle 330 (only one indicated) may be placed around the stress member 225. The flat bundle 330 allows the diameter of the sensor module 130 to be reduced. Furthermore, flat cable terminations (not shown) can be easier to automate in the manufacturing process. It should be appreciated that any shaped bundle in accordance with conventional practice may be used in the present invention, and that other cross-sectional geometries may be employed in alternative embodiments.

Figure 4A:
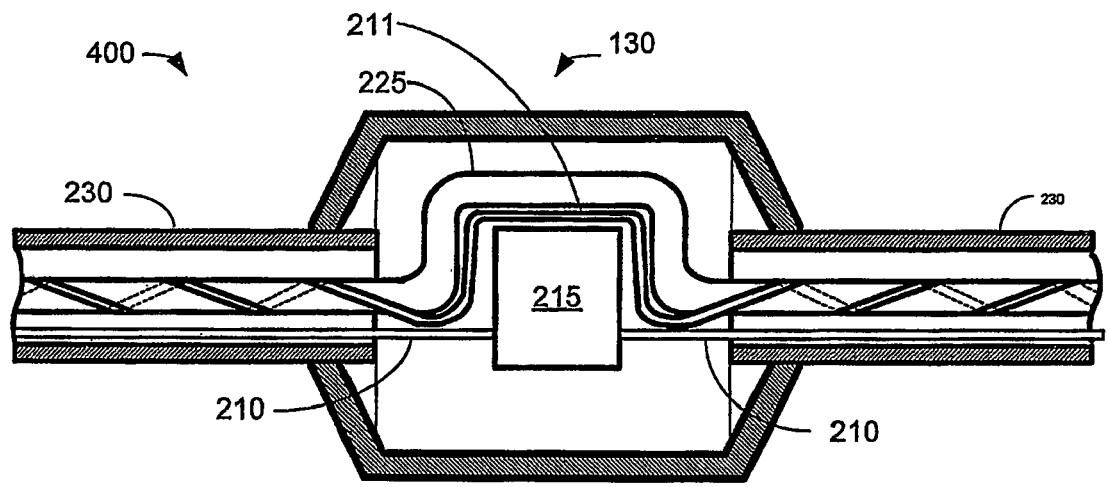
FIG. 4A and FIG. 4B illustrate second and third illustrative embodiments of the seismic cable in FIG. 1 in yet another cross-sectional view.

FIG. 4A illustrates a second illustrative embodiment 400 of the seismic cable 110 in FIG. 1 in a fuller cross-sectional view. The lead 210 is shown coupled to the sensor module 215. The lead 211 is shown in what is known as an "SZ winding" about the stress member 225. A change in winding direction is made inside the sensor module 130 where the lead is protected from outside forces, although the invention is not so limited. The changes in the SZ winding direction may be made at other points on the seismic cable 110 in alternative embodiments. In the second illustrative embodiment shown in FIG. 4A, the lead 211 is shown following the path of the stress member 225.

The SZ winding allows multiple leads 211 to be placed parallel to one another and to the stress member 225 at the change of direction and helps reduce the risk of the stress member 225 crushing the leads 211. It also improves the torsional stability of the cable 110, and therefore improves the response of the seismic sensor 225. The lead 211 is also provided slack at the change in winding direction of the SZ formation (i.e., inside the sensor module 130 in FIG. 4), which allows the leads 211 to be routed away from the stress member 225 without tension to the leads 211. Because the change in winding direction occurs only at the sensor module 130 in the embodiment of FIG. 4A, the leads 211 will be exposed in a static environment, protected inside the sensor module 130.

Figure 4B:
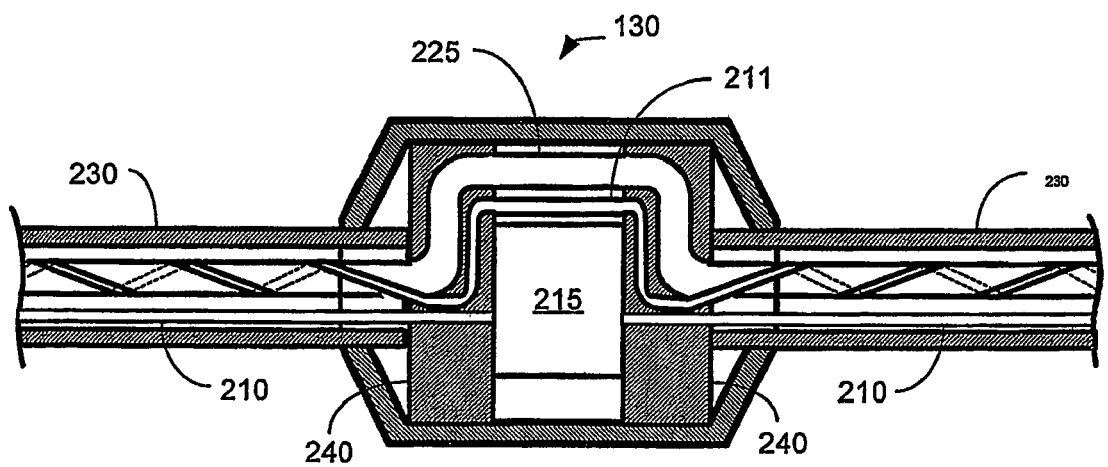

FIG. 4B illustrates in cross section view a third illustrative embodiment of the seismic cable 110 that employs the mechanical guides 240 of FIG. 2A to deflect stress member 225 and leads 211 inside the sensor module 130. Although the lead 210 is shown passing substantially straight through the mechanical guides 240 in the third illustrative embodiment depicted FIG. 4B, in alternative embodiments, the lead 210 may also be deflected by the mechanical guides 240.

Figure 5A:
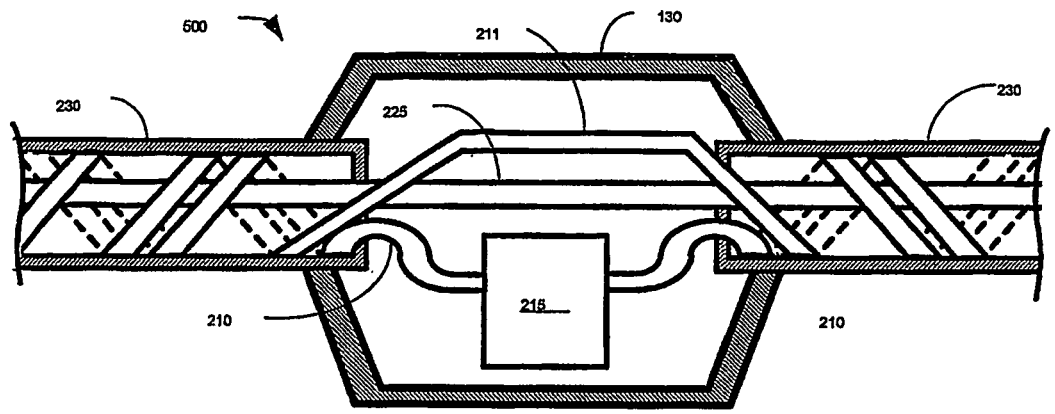
FIG. 5A, FIG. 5B, and FIG. 5C illustrate fourth and fifth illustrative embodiments of the seismic cable in FIG. 1 in yet another cross-sectional view.

Referring now to FIG. 5A, a fourth illustrative embodiment of the seismic cable 500 is shown. In the fourth illustrative embodiment, the leads 210, 211 are deployed in an SZ winding about the stress member 225. The lead 210 is coupled to the seismic sensor 215 and the lead 211 passes through the sensor module 130. However, the present invention is not so limited. In alternative embodiments, the lead 211 may be coupled to the seismic sensor 215. In the fourth illustrative embodiment, the stress member 225 passes undeflected through the sensor module 130, and the seismic sensor 215 may be displaced away from the centre axis of the sensor module 130.

Figure 5B:
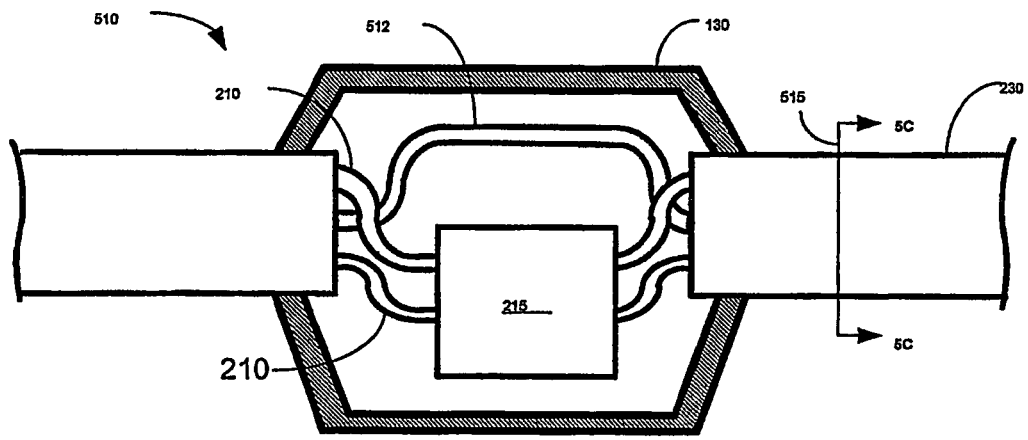

A fifth illustrative embodiment of the seismic cable 510 is shown in FIG. 5B. In the fifth illustrative embodiment, the stress member 225 and the leads 211 are attached to form an inner cable 512, which passes through the sensor module 130. The leads 210, 211 are deployed in a two-layer arrangement that is illustrated in the cross-sectional view indicated by the section line 515 in FIG. 5B and shown in FIG. 5C. In the illustrated embodiment, the inner cable 512 includes the leads 211, the stress member 225 and an inner sheath 520. The leads 211 in the inner cable 512 are deployed between the inner sheath 520 and the stress member 225. The leads 210 are deployed between the sheath 230 and the inner sheath 520 of the inner cable 512.

Figure 5C:
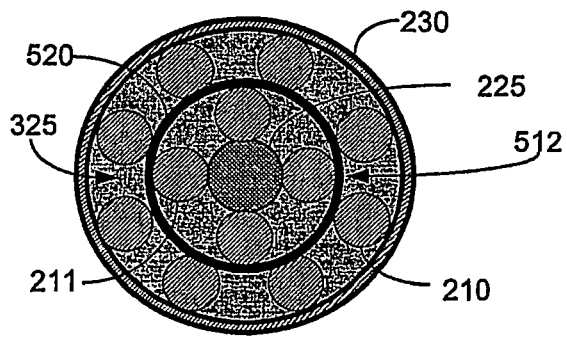

In the fifth illustrative embodiment shown in FIG. 5B-C, the interstitial spaces of the seismic cable 110 among the leads 210, 211 and the inner sheath 520 are filled with a filler 325. The filler 325 may be used to, e.g., absorb any water that may intrude and/or control density in a manner known to the art.

Figure 6:
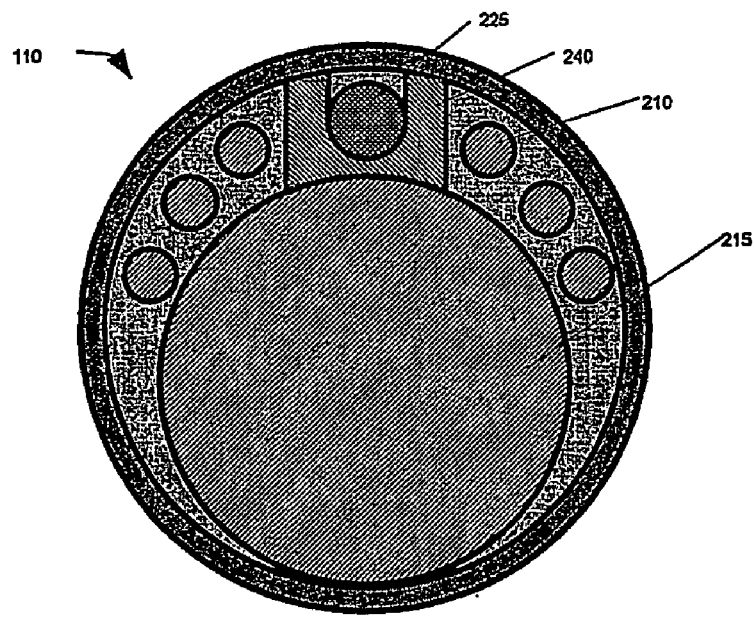
FIG. 6 is a cross-sectional view of one embodiment of the seismic cable 10 shown in FIG. 2B and FIG. 4B.

FIG. 6 is a cross-sectional view of one embodiment of the seismic cable 110 described in FIG. 2B and FIG. 4B. The mechanical guide 240 is shown deflecting the stress member 225 away from the sensor unit 215. In the illustrated embodiment, the leads 210 (only one indicated) bypassing the sensor unit 215 surround the mechanical guide 240. Although not so limited, the leads 210 may also be grouped in bundles or arranged in an SZ winding, as is discussed above.

The seismic survey cable 110 described herein may be manufactured in any suitable manner now known or that may become known to the art. In one method, a cable core, i.e., the stress members 225, the leads 210, 211 and the sensor unit 215, is first built. Pieces of the sheath 230 are then cut to size, threaded onto the cable core, and attached to the cable core in position. The pieces of the sheath 230 then define openings (not shown) at which the sensor modules 130 may be assembled to the seismic cable 110. In an alternative method, the locations on the seismic cable 110 corresponding to the openings are masked from subsequent process steps in which the sheath 230 is extruded onto the cable core. They may be masked by, e.g., applying a metallic tape on the cable core or impregnating the cable core with an anti-bonding agent. The sheath 230 is extruded around the cable core. The portions of the sheath 230 extruded over the masked parts of the cable core are stripped away.

Figure 7:
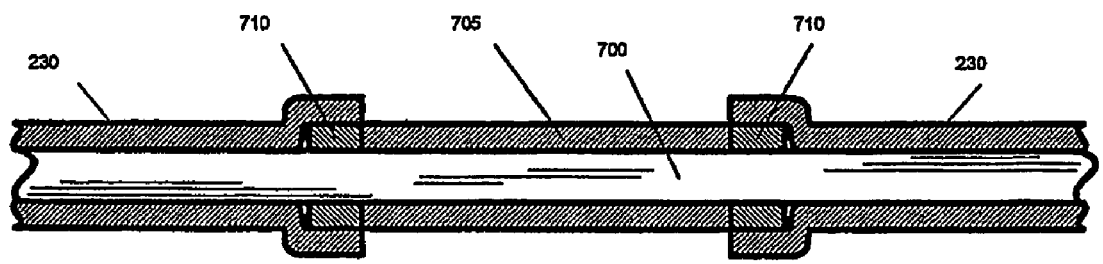
FIG. 7 is a partial cross-sectional view of the termination of the sheath of the seismic cable in FIG. 1 in the sensor module in one particular embodiment While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Note that in each of the illustrative embodiments, the sheath 230 is terminated within the housing of the sensor module 130. This termination may be implemented in a number of ways. For example, the sensor module 130 can be directly clamped around and to the seismic cable 110, which will then clamp the sheath 230 around the opening. Or, consider an embodiment constructed as discussed above, wherein portions of the cable core are masked. Such an embodiment is illustrated in FIG. 7. The cable core 700 includes a portion protected by a mask 705 to create openings for the sensor modules 130. A pair of rings 710 is then positioned on either end of the mask 705. The sheath 230 is then extruded over the cable core 700 and the rings 710, and portions stripped away over the mask 705. The mask 705 is then stripped away (not shown).

After the sheath 230 and the mask 705 are removed, the rings 710 are generally located between the sheath 230 and the stress member 225. The sheath 230 can then be firmly clamped against the rings 710. The rings 710 protect the cable core, and so this clamping can be achieved with a relatively high clamping force. Note that this clamping can be achieved by clamping the sensor module 130 to the cable core as was discussed above. Because the rings 710 allow the sensor module 130 to be attached with a high clamping force, the termination of the sheath 230 can be strongly made.

Note that the seismic cable 110 can be manufactured without any sensor modules 130 or leads 210, 211 which can then be assembled to the seismic cable 110 at a later time. In such an embodiment, the cable core can be constructed using a number of empty tubes (not shown) instead of the leads 210, 211. Open portions can be left on the seismic cable 110 for the later addition of sensor modules 130. When the sensor modules 130 are added, the leads 210 connecting the sensor modules 130 together can be pushed, blown, or pulled through the empty tubes and the appropriate electrical connections made. This design provides modularity for the leads 210, 211. The leads 210, 211 can be cut to a desired length and individually replaced, if needed.

The present invention therefore provides a robust construction, minimizing and protecting the connection points on the seismic cable, and keeps the system size and weight to a minimum, what is important for high data quality recording. More particularly, in its various aspects and embodiments, the invention provides the following advantages over the state of the art:

- a higher reliability for sensor connections, as they are protected inside the sensor module and, when the cable is bent, the connections to the sensors stay static;
- a reduction in the number of electrical connections, and a concomitant reduction in the risk of failure;
- continuous stress member(s) without rupture or termination, contributing to a higher cable strength;
- a reduction in the sensor module outer diameter, as it takes the function of the jacket, and as it improved routing for the leads around the sensor—which, in turn, reduces the cable storage volume, facilitates the cable handling, and contributes to the recording of high data quality by helping achieve good sensor to ground coupling;
- the possibility of smaller and more flexible cable designs—because the sensor module will be small and light, and because the stress member is not weakened by multiple terminations relatively smaller stress members may be used, which will facilitate low weight, low rigidity, highly flexible cable designs exhibiting good coupling and high data quality;
- a greater likelihood of the same axial symmetry for the cable and the sensor module—by deflecting the stress member(s) in the sensor module and by positioning the sensors closer to the sensor module's centre of gravity, more consistent and repeatable recording is possible, independent of how the sensor module rests on the seafloor.

It should be noted that not all of these advantages will be realized in every embodiment of the invention. Still other advantages may become apparent to those skilled in the art having the benefit of this disclosure.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A seabed seismic cable, comprising:
   a sensor module;
   at least one first lead to or from the sensor module;
   a geophone housed in the sensor module;
   a stress member extending continuously through the sensor module independently of any lead, including that portion of the sensor module housing the geophone;
   a first sheath enclosing the first lead and the stress member, the first sheath terminating at each end of the sensor module; and
   at least one mechanical guide in the sensor module deflecting the stress member.

2. The seismic cable of claim 1, wherein the sensor module further houses one or more of an accelerometer, a hydrophone, a tilt meter, or a magnetometer.

3. The seismic cable of claim 2, wherein the sensor module houses electronics for converting analogue signals to digital signals.

4. The seismic cable of claim 1, further comprising a second lead extending continuously through the sensor module.

5. The seismic cable of claim 4 wherein the second lead is attached to the stress member.

6. The seismic cable of claim 5, further comprising a second sheath enclosing the at least one second lead and the stress member.

7. The seismic cable of claim 4 wherein the at least mechanical guide deflects the second lead.

8. The seismic cable of claim 4, wherein the second lead is an optical lead or an electrical lead.

9. The seismic cable of claim 1, further comprising a plurality of leads bundled into at least one bundle.

10. The seismic cable of claim 9, wherein the bundled leads are enclosed by a protective covering.

11. The seismic cable of claim 9, wherein the leads include one or more of an optical lead and an electrical lead.

12. The seismic cable of claim 9, wherein the at least one bundle is cylindrical, oval or flat in cross-section.

13. The seismic cable of claim 1, wherein the stress member comprises one or more of an aramide rope, a steel rope, and a utility cable.

14. The seismic cable of claim 1, further comprising a pair of rings disposed between the first sheath and the first lead and stress member against which the first sheath may be clamped to terminate the sheath.

15. The seismic cable of claim 14, wherein the sensor module clamps the first sheath against the rings.

16. The seismic cable of claim 1, wherein the first sheath comprises one or more of a skin, a jacket, or an extrusion matrix.

17. The seismic cable of claim 1, wherein the mechanical guides deflect the first lead.

18. A seabed seismic cable comprising:
a sensor module;
a geophone housed in the sensor module;
at least one lead deployed in an SZ winding, wherein the lead extends to or from the sensor module;
a stress member extending continuously through the sensor module independently of any lead, including that portion of the sensor module housing the geophone; and
a sheath enclosing the leads and the stress member, the sheath terminating at each end of the sensor module.

19. The seismic cable of claim 18, wherein the direction of the SZ winding changes in the sensor module.

* * * * *

UNITED STATES PATENT AND TRADEMARK OFFICE
CERTIFICATE OF CORRECTION

PATENT NO. : 7,660,193 B2
APPLICATION NO. : 10/532646
DATED : February 9, 2010
INVENTOR(S) : Goujon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 308 days.

Signed and Sealed this

Twenty-eighth Day of December, 2010

David J. Kappos
*Director of the United States Patent and Trademark Office*